United States Patent

Beaudry

[15] 3,648,191

[45] Mar. 7, 1972

[54] RADIOFREQUENCY GENERATOR CIRCUITS AND COMPONENTS THEREFOR

[72] Inventor: Harvey James Beaudry, Fremont, Calif.

[73] Assignee: International Plasma Corporation

[22] Filed: Aug. 19, 1968

[21] Appl. No.: 753,474

[52] U.S. Cl. ....................330/192, 330/65

[51] Int. Cl. ....................H03f 1/00

[58] Field of Search ....................330/192

[56] References Cited

UNITED STATES PATENTS

| | | | |
|---|---|---|---|
| 3,281,708 | 10/1966 | Rodgers et al. | 330/192 X |
| 3,430,157 | 2/1969 | Wood | 330/192 |
| 3,437,931 | 4/1969 | Schultz, Jr. | 330/192 X |

*Primary Examiner*—Nathan Kaufman
*Attorney*—Warren, Rubin, Brucker & Chickering

[57] ABSTRACT

R.F. generator circuits and components therefor including an output circuit for matching the output of the power tube to a transmission line which enables the tube to be operated at power levels below that at which the output circuit is tuned while preventing destructively high plate currents from being established under such conditions by the proper selection of capacitive and inductive components to provide current-limiting resistance in the plate circuit during detuned operation; a large air capacitor in the output circuit of the power tube having metal plates which physically shape the discharge caused by instantaneously high voltages to which the output circuit may be subjected whereby corona emissions are prevented from creating large flames which can be extremely damaging to the equipment; and a power tube grid circuit which matches, in a most unique way, a driving oscillator circuit to the grid and which provides a neutralizing circuit to eliminate the adverse effects of distributive capacitants wherein the neutralizing portion of the circuit eliminates the dangerous condition of having the plate voltage separated from the grid by only a neutralizing capacitor.

2 Claims, 4 Drawing Figures

INVENTOR.
Harvey J. Beaudry
BY
Warren, Rubin, Brucker & Chickering
Attorneys

Patented March 7, 1972 3,648,191

2 Sheets-Sheet 2

INVENTOR.
Harvey J. Beaudry
BY
Warren, Rubin, Brucker & Chickering
Attorneys

RADIOFREQUENCY GENERATOR CIRCUITS AND COMPONENTS THEREFOR

The present invention relates to R.F. generator circuits for use in generators designed for operation at a single operating frequency and more particularly to tuned output circuits and components therefor and grid circuits providing neutralization.

In the present state of the art, it is considered necessary to have the plate or output circuit of the power tube of an R.F. generator designed for operation at a fixed operating frequency tuned at all power levels of operation to among other things prevent excessively high plate currents from being established which if allowed to flow over a sustained period of time would permanently damage the tube. In order to maintain a tuned condition, it is necessary to provide adjustable capacitance and inductance components in the tuned output circuit and to adjust the values of these components whenever there is a change in the operating conditions of the system in which the R.F. generator is operating. The necessity of constantly adjusting the generator to maintain a tuned condition in the output of the power tube is an annoyance for which a solution has long been sought but which until the present invention has not met with a satisfactory solution. The present invention teaches a output circuit for an R.F. generator which enables the generator to be operated throughout its rated power range without the necessity of adjusting any components in the output circuit as a consequence of a change in operating power level. In describing the present invention, there will be occasional reference to component values and other measurements of system operation in order to aid in an understanding of the invention although it will be clear to those skilled in the art that such component values or other descriptions of operating conditions in terms of numerical values are by way of example only and do not restrict the inventions to such stated values.

In order to provide a power tube which can be operated over its full rated power range without requiring adjustments in the tuned output circuit of necessity requires that the tube be capable of sustained operation while the output circuit is detuned. The first step in achieving this result is to select a power tube not for operation at tuned conditions but rather at detuned conditions. This, of course, requires that the extra loads on the various elements of the tube due to mismatched conditions be taken into account. Thus a tube plate voltage, screen voltage, screen current, plate dissipation and grid dissipation must be of a rating sufficient to handle the anticipated conditions. As a general rule, this will require a tube of 2 to 4 times the power rating of a tube which would operate successfully for a tuned output condition. This alone does not provide the result since if there is a mere substitution of one tube for a tube having twice the power rating the larger rated tube is still not capable of withstanding the currents which would be induced during operation with the output circuit detuned since these currents are anywhere from 5 to 10 times the magnitude experienced during tuned operation and far in excess of the current magnitudes which even a double-rated tube can sustain under continued operation. Thus the present invention teaches the combination with an overrated power tube an output circuit having inductive and capacitive elements selected to provide resistive characteristics at the operating frequency of the generator which limits the current which flows in the plate circuit during detuned operation to a magnitude which the tube can safely handle. At the same time, the resistive characteristics of the inductive and capacitive components of the output circuit are not so limiting as to interfere with the normal operation of the tube. If as previously suggested it is desired to have a generator with a rating of 1,000 watts the power tube and its output circuit are tuned for the 1,000-watt output operating condition at which it can be expected that the efficiency of operation (100 times the amount of DC power, divided by the output power is required to produce the desired output power) will be 90 percent or higher. When the generator is adjusted to operate at something less than 1,000 watts of power output, the power tube output circuit will no longer be tuned which will result in a decline in efficiency with an accompanying increase in plate current. Because the tube is called upon to produce an output under detuned conditions, it is necessary to supply the tube with more input power to produce certain output powers less than 1 kilowatt than it is to produce the 1-kilowatt output under the tuned conditions. This explains the necessity for providing a tube having a rating greater than 1,000 watts.

When R.F. generators are employed to provide power for devices such as plasma machines which are characterized by loads which can change from full load to zero load, it is not unusual for extremely high voltages (10s of kilovolts) to be instantaneously established at the output of the power tube. These high voltage conditions at the power tube output are sufficient to cause corona emissions (flames) which have been known to severely damage the generators exposed to such conditions. The present invention teaches the use of a capacitor in the output circuit which is formed from metal plates which operate to shape any high voltage which may occur at the output of the power tube in such a way as to prevent corona emissions and thereby eliminate the hazards attendant thereto.

There are two general approaches recognized in the art for providing driving power to the grid of the power tube of an R.F. generator, both of which approaches have serious drawbacks. For R.F. generators designed to produce 300 or 400 watts of output power it has been generally accepted that a low-gain drive system can be employed which may require anywhere from 10 to 20 percent of the desired output power to drive the grid. This approach has the advantage of stability. When the power requirements for an R.F. generator, however, reached the kilowatt level it becomes less than feasible to provide a drive for the grid which itself requires as much as 200 watts of power. Thus, it becomes necessary to consider the second general approach to providing driving power to the grid of the power tube which is to use a high-gain system wherein it is possible for a small fraction of 1 watt to provide all the drive necessary for a kilowatt generator. Such high-gain systems, however, are inherently unstable and accordingly require extremely expensive and physically expensive support circuitry to prevent instabilities during operation. The present invention teaches a grid drive circuit which although of the high-gain approach is neither expensive relative to known circuits nor dependent on the use of physically large components which cause such equipment to be characteristically bulky. The present invention accomplishes this result by the unique use of a tank circuit coil and the effective reduction of the input impedance to the grid so as to eliminate the necessity for compensating an extremely large mismatch between the drive grid circuit and the grid itself. In addition, the grid circuit of the present invention provides stable operation through a neutralizing circuit which eliminates the dangerous condition of having the tube plate voltage separated from the grid by only the neutralizing capacitor, which is characteristic of those neutralizing circuits now known in the art.

Accordingly, it is an object of the present invention to provide an output circuit for the power tube of an R.F. generator which enables the tube to be operated at power levels other than that at which the output circuit is tuned without requiring retuning and without inducing currents in the plate which are beyond the maximum current for which the tube is rated and which the plate can handle during sustained operation.

It is a further object of the present invention to provide a capacitor in the output circuit of the tube of an R.F. generator which is formed of spaced-apart metal plates which operate to shape high-voltage discharges impressed on the capacitor in such a way as to avoid dangerous corona emissions and thus prevent such high-voltage conditions from being potentially damaging to the generator.

It is a further object of the present invention to provide a grid circuit for the power tube of an R.F. generator which matches the grid drive circuit to the grid through the unique use of a tank circuit and provides for neutralization to eliminate the adverse effects of distributed capacitance without establishing the dangerous condition of having the plate voltage separated from the grid by only the neutralizing capacitor, as is presently practiced in the art.

Further and more specific objects and advantages of the present invention will be made apparent in the following specification wherein a detailed description of a preferred embodiment of the invention is described with reference to the accompanying drawings.

Figure 2:
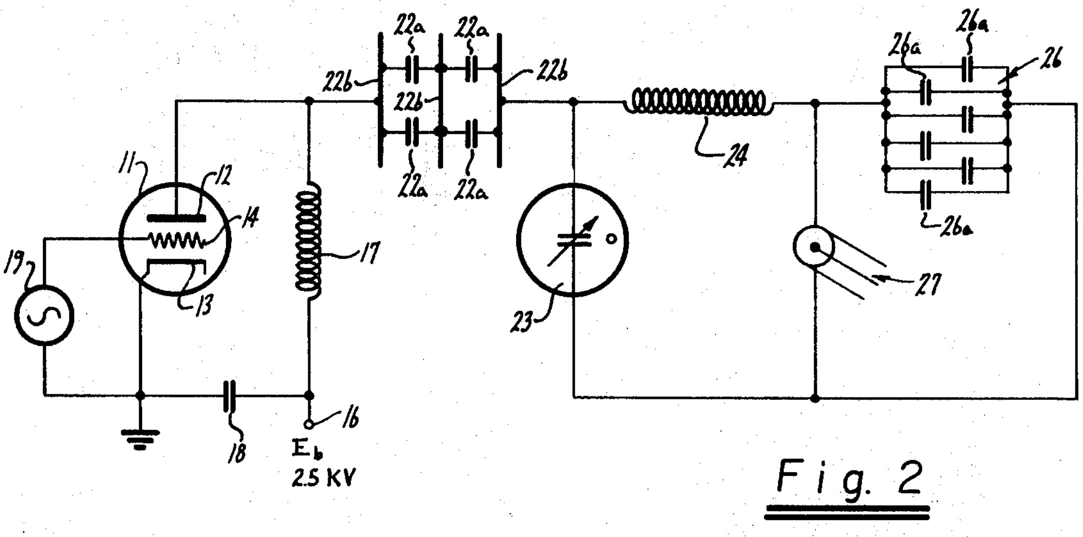
FIG. 2 is an electrical schematic illustration of an output circuit for the power tube of an R.F. generator as taught by the present invention.
Figure 4:
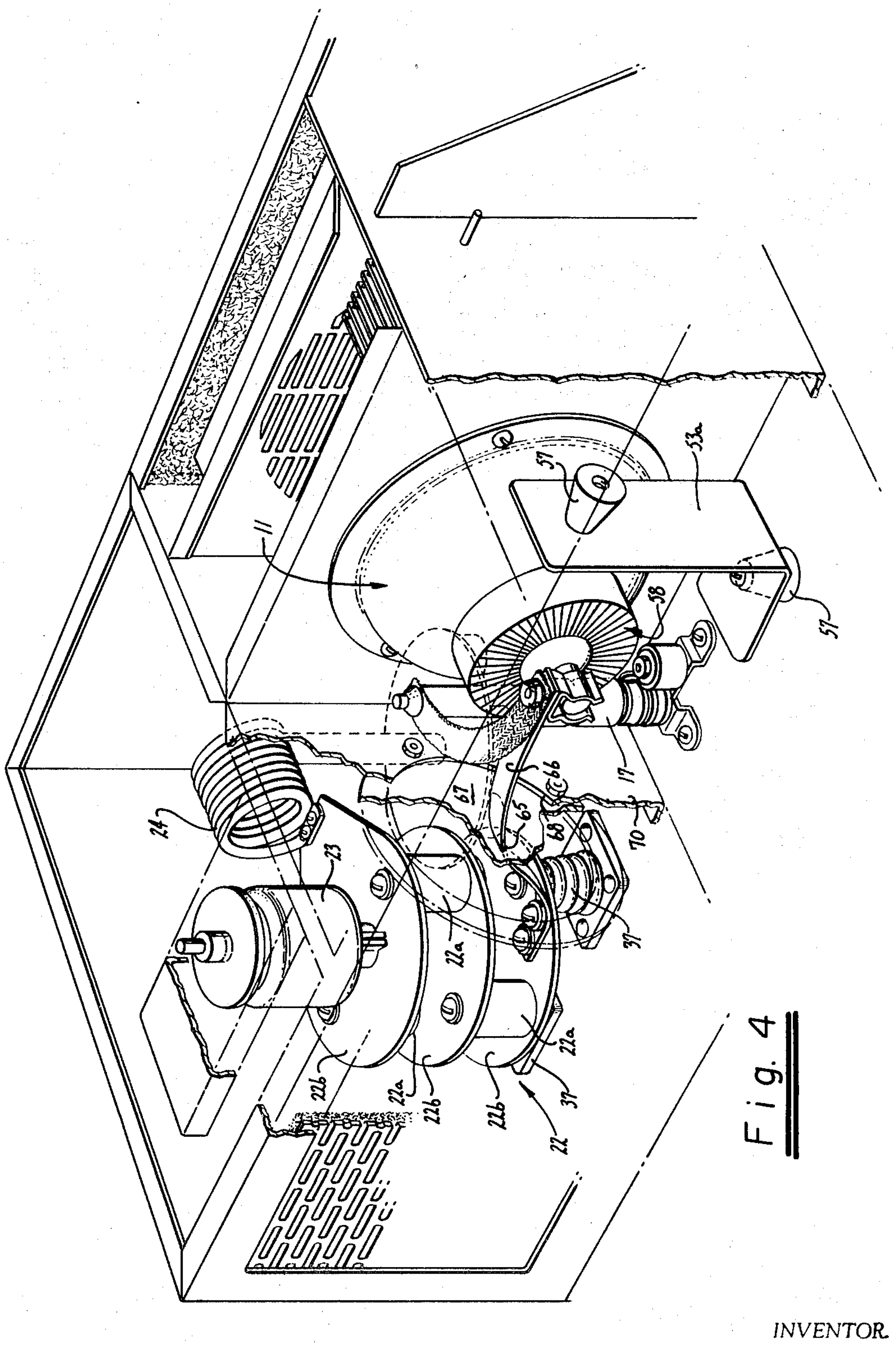
FIG. 4 is an isometric illustration of the physical embodiment of several of the electrical components represented in FIG. 2.

Referring initially to FIGS. 2 and 4, a tube 11 represents a power tube designed for operation at a particular R.F. frequency (13.56 megacycles) and includes a plate 12, a grounded cathode 13 and a grid 14. The plate 12 receives operating voltage from a source 16 through a choke coil 17 electrically disposed between the plate and the source. A bypass capacitor 18 operates to prevent any R.F. signals which might get through the coil 17 from reaching the source 16 and causing damage thereto. The grid 14 operates to drive the power tube and is itself driven by a circuit 19 which will be described in greater detail below. If it is desired to operate the generator at a rated output of 1,000 watts, then the tube 11 must be capable of operation at levels which exceed the conditions normally anticipated for such a rated output, since operation at detuned output conditions are required by the present invention.

Thus in selecting a tube 11, it is necessary to first calculate the various currents and voltages which the tube components can anticipate taking into account the fact that the tube will be called on to operate into a mismatch, or detuned output circuit. The results of the selection process will be a tube which appears to be several times the rating necessary but in fact will require almost all of its rated ability to operate for sustained time periods in the present invention. The processes for determining anticipated plate voltage and dissipation, screen voltage, screen current, and grid dissipation are well known as are the techniques for selecting a tube to meet such anticipated conditions.

The plate 12 is capacitively coupled through a capacitor network 22 and a pi-network formed by vacuum capacitor 23, coil 24 and capacitors 26 to an output transmission line 27 which delivers the power from the generator to a desired load. Since the impedance of the tube is characteristically several thousand ohms while the characteristic impedance of transmission lines is generally approximately 50 ohms, it is a known design technique to provide a pi-network between the output of the tube and the transmission line in order to compensate for the impedance mismatch. Since the impedance of the tube is a function, among other things, of the power level at which the tube is operating, pi-networks employed to match such tubes to a transmission line of necessity employ capacitors and inductive coils which are adjustable to enable the pi-network to be adjusted with changes in operating levels of the tube so as to maintain a perfect match between the tube and the output transmission line. When the tube and transmission line are matched through the pi-network, the output circuit of the tube is tuned and the tube operates in its most efficient manner. Prior art generators are so designed that it is necessary to adjust the inductive and capacitive components of the pi-network whenever a change in operating level occurs in the tube 11 in order to constantly maintain a tuned condition. The necessity of constantly tuning the output circuit is bothersome and potentially dangerous in that if it is not properly maintained, conditions can be created in the tube which can result in permanent damage to the tube and which more specifically take the form of current flows beyond the maximum for which the tube is rated.

In the present invention, an output circuit is provided which does not require any changes in the value of the components of the pi-network so that power levels of the tube 11 or other operating conditions can be changed without requiring attendant readjustment of the generator plate circuit. The ability of the present invention to operate in this convenient manner is achieved by providing a power tube 11 with the necessary operation ratings which as mentioned above will exceed those previously considered adequate for a given generator output power rating. This alone is not sufficient to produce the desired result, since operation under detuned conditions results in currents in the plate of the tube which are between 5 and 10 times the current which exists when operation is conducted under tuned conditions and far exceeds the maximum currents for which the tube is rated. Accordingly, it is necessary to provide some current-limiting means which will inhibit the establishment of excessively high currents when operation is conducted under detuned conditions.

Figure 3:
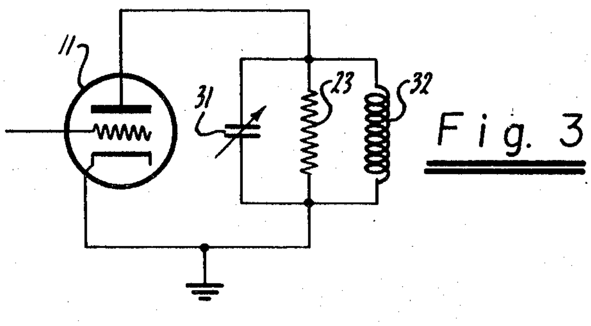
FIG. 3 is an electrical schematic diagram illustrating an equivalent circuit to the diagram of FIG. 2 wherein all of the components have been lumped.

FIG. 3 shows the power tube 11 with a plate circuit which is the electrical equivalent of the circuit of FIG. 2 with all of the various components lumped. When the circuit is tuned, the resonant circuit formed by the equivalent capacitor 31 and the equivalent inductor 32 determines the current flow in the circuit and since the tube is designed to operate with a tuned output circuit, the particular output current induced is within the expected operating range of the tube. When the circuit is detuned, however, the resistive elements 33 which includes the R.F. resistance of the various components, is the predominate current-limiting factor and is not, in conventional designs, sufficient to limit the current in the plate circuit from exceeding the rated value of the tube 11. In the present invention, the pi-network capacitor 26 is formed by a plurality of capacitors **26*a*, electrically arranged in parallel and selected especially to have relatively low-resistance characteristics. A perfect capacitor or ideal capacitor is one which is a pure capacitance with infinite resistance. The quality of capacitors is, therefore, frequently related to the amount of resistance which they exhibit with the best capacitors being those with the highest resistance. The coil 24 likewise has certain resistive characteristics which are a function of the geometry of the coil and which can be increased or decreased by changing the geometry of the coil as is well known in the art. A further source of resistance for resistor 33 is the coupling capacitor 22 which as seen in FIG. 2 is formed from a plurality of resistors 22*a* which are coupled together between three plates 22*b* which themselves form capacitors having certain resistive characteristics. By using a plurality of capacitors 26*a* selected from other then high-quality capacitors and by the proper shaping of coil 24 and selection of capacitors 22*a* it is possible to achieve a lump resistance 33 (at the R.F. operating frequency of the generator) which limits the current in the plate circuit during detuned operating conditions which is below the current level at which the tube can be damaged. It is, however, important that the resistance 33 not be so great as to inhibit sufficient current flow in the plate circuit to enable the desired operation of the tube to be carried on. Accordingly, the resistance 33** should provide a current in the plate circuit during detuned operations which is just below the maximum rated plate current so as to allow proper operation of the tube but at the same time protect the tube from damage.

Since the value of resistance necessary to properly limit the plate current is a function of several operating conditions (frequency, power level, etc.) as well as the particular characteristics of the tube itself, no formula can be stated for selecting the resistance characteristics of capacitors **22*a* and 26*a* and coil 24** but their selection is more-or-less well within the skill of the art once the desired result is known. In terms of circuit Q, the components of the plate circuit are selected to give that circuit a Q relative to the Q of the tube which is sufficiently low at the operating frequency to enable the effective resistance of the components in the output circuit to be reflected back into the plate circuit as a current-limiting means.

By supplying these resistive characteristics in the capacitive and inductive components of the output circuit which result in an equivalent resistor 33 which limits the maximum current in the plate circuit during operation under detuned conditions the present invention teaches for the first time a radiofrequency generator which when designed for operation at a single frequency is capable of sustained operation over its entire power range without requiring adjustment of the output circuit. In addition to the convenience which such a circuit offers, there is also the advantage of being able to allow the generator to operate unattended with the confidence that if the power level of the tube should change or some other condition change which detunes the output circuit, the tube would not be severely damaged.

Referring to FIG. 4, the capacitor 22 is formed by three generally circular, preferably silver-plated, plates *22b* spaced apart from one another and maintained in that spaced-apart relationship by cylindrical capacitors *22a* which are both mechanically and electrically secured between adjacent plates. Two capacitors *22a* are disposed between the lower and middle plates *22b* along a single diameter while a second pair of cylindrical capacitors *22a* are disposed between the top plate and middle plate on the opposite ends of a diameter which is generally perpendicular to the diameter on which the lower capacitors *22a* reside. The bottom capacitor plate *22b* is disposed above the base of a chassis 36 by high-voltage standoff 37 to prevent grounding of the capacitor. Besides adding capacitive values required in the system, the plates *22b* make it possible for large voltages (10s of kilovolts) to be absorbed by the output circuit of the power tube without accompanying corona emissions which can be damaging to the components both of the capacitor itself and of adjacent components. The plates operate to shape the voltage discharge in a manner which dissipates the energy without allowing sufficient concentration of arcing to occur which can result in flaming. The presence of capacitor 22 constructed according to the teachings of the present invention is of extreme importance when the R.F. generator is used in connection with plasma machines which present a somewhat unusual load situation to the generator. R.F. generators which are most frequently thought of as operating to provide power to an antenna transmitting a communication signal assume that the load will be substantially constant and everpresent. When providing R.F. power for a plasma machine, however, these operating conditions cannot be assumed since it is well within the anticipated operating conditions to have a collapse of the plasma with an attendant total loss of the load, resulting in rather large instantaneous voltages being established in the output circuit of the power tube. The presence of capacitor 22 with its ability to suppress the dangerous conditions attendant high voltages, allows a plasma machine, for instance, to be used experimentally without the fear that the unexpected loss of the plasma will result in permanent damage to the generator. This, of course, gives the whole plasma machine a more flexible capability which is a prime importance to research instruments.

Figure 1:
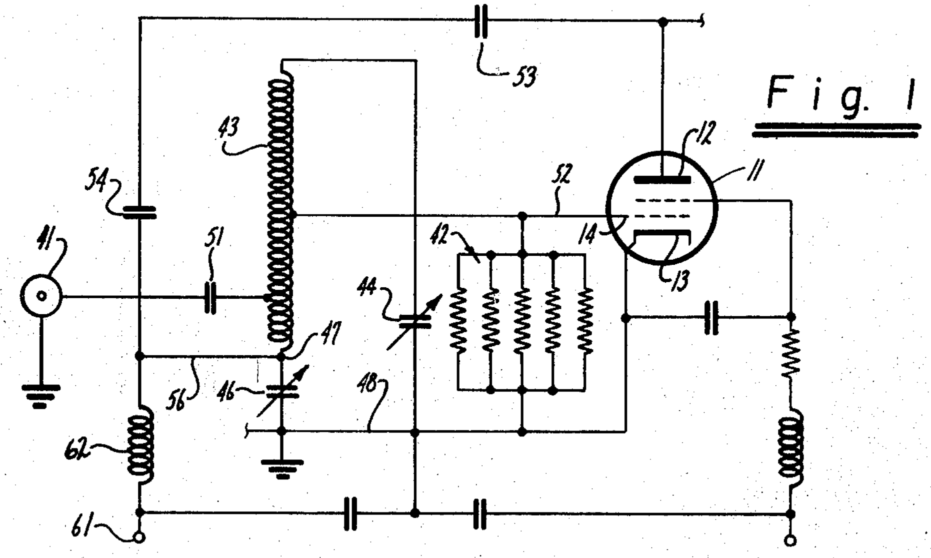
FIG. 1 is an electrical schematic illustration of the grid circuit of a power tube for an R.F. generator as taught by the present invention.

Referring now to FIG. 1, the grid 14 of power tube 11 is driven by an oscillator circuit (not shown) the output of which is transmitted over a transmission line 41 having a characteristic impedance of 50 ohms. Since for most power tubes the grid impedance is several tens of thousands of ohms, a difficult problem is presented in trying to matching the 50-ohm transmission line 41 to the grid 14 since such a large mismatch in impedance is only compensated for by a circuit having inductive and capacitive elements which of necessity are of a value as to require expensive and physically large components. As a first step to solving the problem of delivering driving power from the transmission line 41 to the grid 14 the present invention employs a plurality of swamping resistors 42 connected in parallel with each other and together connected in parallel with the grid 14. The resistors 42 are selected to have a combined resistance of approximately 1,000 ohms which has the effect of making the impedance loading into the grid approximately 1,000 ohms. Thus resistors 42 significantly reduce the magnitude of the mismatch between the grid 14 and the transmission line 41. Besides reducing the mismatch, resistors 42 also serve to produce a low-impedance grid which is easier to drive.

The remaining mismatch is cured by a most unusual and unique use of a coil 43 which forms a tank circuit with a capacitor 44 and is connected through ground through a carefully selected capacitor 46. The capacitor 46 is selected to have a resistance at the frequency of operation of the oscillator which is very low so that the junction 47 between the capacitor 46 and inductor 43 is to an R.F. signal very close to the ground line 48. The coil 43 is selected to have an impedance at the operating frequency of the generator which is greater than the impedance of the grid 14 (previously indicated as being 1,000 ohms due to the presence of resistors 42) but not so great as to make it difficult to provide a capacitor 44 which will form a resonant circuit with the inductor at the generator's characteristic frequency. The 50-ohm transmission line 41 is connected through a blocking capacitor 51 to a point on the inductor 43 which is precisely 50 ohms above the ground line 48 such that the transmission line operates into a perfectly matched load. The grid 14 on the other hand is connected by a conductor 52 to a point on the inductor 43 which is 1,000 ohms above ground 48 whereby the grid 14 sees a perfectly matched system. This unique employment of a coil 43 obviates the necessity of employing transformers and associated capacitors which are expensive and physically expansive, without giving up any advantages in performance.

In addition to the direct benefit provided the coupling circuit described above, there is the additional benefit that the matching circuit provides a convenient means for applying a DC bias to the grid 14 as well as a convenient means for establishing a neutralizer circuit for the tube 11.

It is well known in the art that it is necessary to deal with the distributed capacitances inherent in a power tube of the type under discussion if significant losses of efficiency are to be avoided. In this respect, it is also well known to cancel the effects of the distributed capacitance by feeding a portion of the output of the tube back to the grid through a path which includes a resonant circuit for reversing the phase of the signal with respect to the phase of the signal at the plate 12. A common characteristic of all neutralizer circuits known in the art is the undesirable situation of having the plate voltage (2.5 kilovolts) separated from the grid by only the neutralizer capacitor such that a failure of the capacitor which would allow arcing would result in total destruction of the tube. In the present invention, the plate 12 is capacitively coupled by a capacitor 53 (see FIG. 1) which is in turn connected to a capacitor 54 which is joined to the coil 43 by a conductor 56 which is joined to the junction 47, which looks into a low impedance. If a failure should occur which places the plate voltage at the input to the grid, the low-impedance swamping resistors 42 would prevent the voltage from damaging the grid. The capacitor 53 has a unique physical configuration which is best seen in FIG. 4. The capacitor 53 is formed by a silvered plate *53a* supported by insulated standoffs 57 at a location adjacent to the external portion 58 of the anode 12 of the tube 11. The mass of the external portion 58 of the plate is sufficient to form with plate *53a* the capacitance required to divert from the output of tube 11 that quantity of power sufficient to perform the neutralization function. The capacitor 54 serves as a safety factor in isolating the grid from the plate 12 while the introduction of the neutralizing signal through the resonant circuit of the coil 43 and capacitor 44 insures that neutralization is accomplished at precisely the frequency at which the generator is designed to operate. The capacitor 46 has a further function of acting as a trim capacitor to precisely adjust the amount of output power which is delivered back to the grid for neutralization since only when the precise amount required is made available does effective neutralization occur. Capacitor 44 is also made adjustable to provide for the precise capacitance necessary for resonants of the circuit at the operating frequency.

An additional advantage provided by the resonant matching circuit is the ability to introduce bias to the grid 14 without introducing undesirable capacitive or inductive reactances which as is known in the art, are to be avoided at the grid. A DC bias source 61 is introduced to the grid through a choke coil 62 connected to conductor 56 which as previously described connects to junction 47. By introducing the bias through the described inductive path including the coil 43, the grid receives the necessary DC biasing without any accompanying inductive or capacitive reactance being added to the impedance of the grid whereby the desired operation is properly carried out.

Another feature of the present invention (best seen in FIG. 4) is what is referred to as a "R.F. window" by which the output from the plate of the tube 11 is delivered to the capacitor 22 while allowing the two aforementioned components to be physically housed in separate compartments. The tube 12 has a certain amount of attendant heat which is dissipated during operation and which can adversely effect the operation of other components of the system if they are subjected to that heat. Thus, the conducting strap 66 which electrically joins the plate of tube 11 to the capacitor 22 passes through a hole 65 formed in a teflon member 67 which is secured to a wall 70 which separates the tube and the capacitor in order to maintain air separation therebetween. The teflon member 67 is disposed to close an opening 68 formed in the wall 70 and positioned to dispose the hole 65 in the central portion of the opening 68. The hole 65 is preferably of a geometric size and shape which is substantially the same as the cross section of strap 65 whereby when the strap passes through the hole it eliminates any means of air passing through the wall 70. By having the strap 66 pass through a teflon member and maintained a substantial distance from the metallic portions of the wall 70 the chances of arcing or accidental grounding of the tube are substantially eliminated. The use of teflon as the material for the window is of importance due to its ability to physically withstand exposure to R. F. voltages of the magnitude to be expected from the plate of tube 11.

What is claimed is:

1. In an R. F. generator having a single operating frequency and a stated output power rating and which transfers power to a widely varying load through a transmission line having a characteristic impedance;

a power tube having plate, grid and cathode, and having an operating capability greater than the rated power output of the generator;

a circuit including inductance elements and capacitance elements, electrically disposed between said plate and the transmission line, and said inductance and capacitance elements including a pi-network formed by two capacitance elements and an inductance element therebetween;

said pi-network being tuned to resonance at the operating frequency and rated power output of the generator and being detuned at all other output power levels;

said inductance elements and capacitance elements having sufficiently lossy resistance characteristics under detuned operating conditions to be the predominant current limiting factor in the circuit and having a value under such detuned conditions limiting the magnitude of plate current to a level below the maximum plate current for which the tube is rated, whereby the tube will be protected from damage during operation under detuned conditions;

one of the capacitance elements which forms said pi-network being formed by a plurality of lossy, parallel connected capacitors, whereby the desired degree of resistance may be more readily achieved for a given overall value of capacitance; and said resistance characteristics being small compared to the reactance characteristic of said inductance and capacitance elements, whereby maximum generator efficiency will not be greatly impared under tuned conditions while simultaneously limiting plate current flow under detuned operation.

2. The circuit of claim 1 wherein one of the capacitance elements is electrically disposed between the plate of the tube and the remaining portions of the output circuit and operates as a blocking capacitor and is formed by a plurality of individual capacitors having relatively low-resistance characteristics at the operating frequency of the generator.

* * * * *